United States Patent

Saito

[11] Patent Number: 5,968,642
[45] Date of Patent: Oct. 19, 1999

[54] ARTICLE HAVING A WATER-REPELLENT FLUORORESIN SURFACE, AND METHOD FOR MANUFACTURING THE SAME

[75] Inventor: Takumi Saito, Shimizu, Japan

[73] Assignee: DuPont-Mitsui Fluorochemicals Co., Ltd., Japan

[21] Appl. No.: 08/507,228

[22] PCT Filed: Dec. 21, 1994

[86] PCT No.: PCT/JP94/02163

§ 371 Date: Aug. 18, 1995

§ 102(e) Date: Aug. 18, 1995

[87] PCT Pub. No.: WO95/17477

PCT Pub. Date: Jun. 29, 1995

[30] Foreign Application Priority Data

| Dec. 22, 1993 | [JP] | Japan | 5-345497 |
| Oct. 6, 1994 | [JP] | Japan | 6-266124 |
| Oct. 6, 1994 | [JP] | Japan | 6-266125 |
| Oct. 13, 1994 | [JP] | Japan | 6-273136 |
| Oct. 14, 1994 | [JP] | Japan | 6-275600 |

[51] Int. Cl.[6] ............. B32B 5/16; B32B 27/28; B05D 1/06; B05D 1/12

[52] U.S. Cl. ......... 428/304.4; 428/327; 428/421; 428/422; 428/317.9; 427/458; 427/461; 427/475; 427/485; 427/180; 427/372.2; 427/375; 427/385.5; 427/421

[58] Field of Search .............. 428/304.4, 315.5, 428/317.1, 317.9, 318.4, 327, 402, 422, 421; 427/458, 461, 470, 475, 485, 180, 189, 195, 372.2, 375, 384, 385.5, 421; 264/109, 112, 123, 125, 126, 127

[56] References Cited

U.S. PATENT DOCUMENTS

| 3,864,322 | 2/1975 | Yallourakis | 260/87.5 A |
| 4,256,845 | 3/1981 | Morris et al. | 521/61 |
| 4,460,530 | 7/1984 | Hanson et al. | 264/121 |
| 4,622,036 | 11/1986 | Goodrum | 604/367 |
| 4,855,162 | 8/1989 | Wrasidlo et al. | 427/243 |
| 4,898,779 | 2/1990 | Yoshimura et al. | 428/402 |
| 5,143,783 | 9/1992 | Shimizu et al. | 428/327 |
| 5,164,426 | 11/1992 | Shimizu et al. | 523/201 |
| 5,216,067 | 6/1993 | Yamada et al. | 524/520 |

FOREIGN PATENT DOCUMENTS

| 61-66730 | 4/1986 | Japan. |
| 2-140239 | 5/1990 | Japan. |
| 5-32810 | 2/1993 | Japan. |

Primary Examiner—Vivian Chen
Attorney, Agent, or Firm—Wenderoth, Lind & Ponack, L.L.P.

[57] ABSTRACT

An article having a water-repellent fluororesin surface and a method for manufacturing the same, wherein the article has a water-repellent fluororesin surface composed of an irregularly porous material which has a maximum IPA diffusion diameter of at least 8 mm and is formed by irregularly stacking fluororesin particles with an average diameter of no more than 40 microns over one another and has a water droplet roll angle tangent of no more than $^{50}/_{500}$. The obtained article has a fluororesin surface which exhibits excellent water-repellency, inhibits adhesion of water drops and soil entrained by the water drops and imparts a great bond strength to the substrate.

13 Claims, 3 Drawing Sheets

ARTICLE HAVING A WATER-REPELLENT FLUORORESIN SURFACE, AND METHOD FOR MANUFACTURING THE SAME

This application is a 371 of PCT/JP94/02163, filed Dec. 21, 1994.

FIELD OF THE INVENTION

The present invention relates to an article having a fluororesin surface that has excellent water repellency and to which water drops, the soil entrained by these water drops, etc., do not adhere, and relates to a method for manufacturing said article.

DESCRIPTION OF PRIOR ART

Water repellency, weather resistance, stain resistance, and other such characteristics need to be imparted to the surface of many industrial devices, household devices, etc.. The method that has been used most often in the past to impart these surface characteristics is to roughen the surface of a conventional substrate by blasting or etching, treat it with a primer or the like, and then coat it with an enamel or another paint that contains fluororesin particles such as polytetrafluoroethylene (PTFE), which has excellent non-stick properties, then dry this coating and bake it at 350 to 400° C. to create a fluororesin coating on the article surface.

It is known, however, that the water repellency of an article is greatly affected not only by the water repellency characteristics of the molding material, but also by the surface condition. Therefore, recent years have seen attempts at achieving better water repellency in an article by making the actual surface area greater than the apparent surface area by means of microscopic protrusions present on the article surface.

For instance, in Japanese Laid-Open Patent Application Hei 4-239633 is disclosed a method in which a water-and oil-repellent film whose surface is irregular is formed by chemically bonding an irregular layer, produced by mixing microparticles and silicate glass, to a polymer film layer that contains fluorocarbon groups and siloxane groups by means of these siloxane bonds.

In Japanese Laid-Open Patent Application Hei 4-283268, a polytetra-fluoroethylene oligomer with a molecular weight of about 8,000 to 10,000 is dispersed in a plating solution, and the oligomer is co-deposited on a plating film to form a water-repellent metal composite.

In Japanese Laid-Open Patent Application Hei 6-122838 is disclosed a water-repellent paint and a coating method in which a low-molecular weight polytetrafluoroethylene powder with a molecular weight of about 500 to 20,000 is admixed and dispersed in an acrylic silicone resin.

However, with a method that involves siloxane bonds, a step is required in which a water-repellent film is formed by means of the siloxane bonds after an irregular layer has first been formed, and the drawback to a plating method is that articles on which a water-repellent film can be formed are limited to those that can be plated. With a method in which a low-molecular weight PTFE is admixed and dispersed in an acrylic silicone resin, a special low-molecular weight PTFE that has been fluorinated all the way to the ends is required.

In light of this invention, the inventors perfected the present invention upon discovering that excellent water repellency is imparted by forming an irregularly porous material by the hard-to-exfoliate layering of high-molecular weight fluororesin particles having a specific diameter over one another and discovering a variety of methods for obtaining such water-repellent article.

Therefore, the object of the present invention is to offer an article, and a manufacturing method therefor, that has fluororesin surface with dramatically higher water repellency and stain resistance than those achieved with prior art.

DISCLOSURE OF THE INVENTION

The present invention is an article having a water-repellent fluororesin surface, which is characterized by having a water droplet roll angle tangent of no more than $5%_{00}$ and being composed of an amorphous porous material which has a maximum isopropyl alcohol (IPA) diffusion diameter of at least 8 mm and is formed by layering fluororesin particles with an average particle diameter of no more than 40 microns over one another.

The above-mentioned article having a water-repellent fluororesin surface can be manufactured, for example, by a method in which an article is coated with fluororesin particles with an average particle diameter of no more than 40 microns, with water or an organic liquid containing said fluororesin particles, or with a mixed dispersion thereof, and the fluororesin particles are surface-fused in a state in which said particles can come into contact with each other, or by a method in which the surface fusion involves the use of a film molding auxiliary, or by method that involves fixing in a non-molten state.

(Fluororesin Particles)

The fluororesin in the present invention is a thermoplastic resin containing at least one fluorine atom per molecule. A polytetrafluoroethylene (PTFE) resin, a tetrafluoroethylene-hexafluoropropylene copolymer (FEP), and a tetrafluoroethylene-perfluoro(alkyl vinyl ether) copolymer (PFA; perfluoroalkyl group: $C_1$ to $C_5$) resin, or another such perfluororesin is favorable.

Among perfluororesins, a resin with a molecular weight of at least 100,000 is preferable. Using an ordinary commercially available resin as this resin is advantageous from a cost standpoint.

(Irregulary Porous Material)

In order for the fluororesin surface to exhibit water repellency that is greater than the water repellency inherent to the fluororesin that serves as the molding material, it should have a surface structure in which there is less area in contact with water droplets. To this end, the surface of the article of the present invention must be covered with a porous material containing voids on the order of microns that is formed by the layering of fluororesin particles with an average particle diameter of no more than 40 microns over one another.

The porous material of the present invention does not have a constant shape, but instead has fluororesin particles that are irregularly stacked one over the other, and therefore comprises an irregularly fluororesin structure and voids, as shown in the electron micrographs in FIGS. 1 through 5. The fact that individual fluororesin particles whose average particle diameter is no more than 40 microns are seen in this structure is a characteristic feature of the irregulary porous material of the present invention. In contrast, an article having a fluororesin surface other than that of the present invention will be fused overall, as shown in FIG. 6, so no voids will be present and a porous material will not be formed.

(Average Particle Diameter)

The fluororesin particles that form this porous fluororesin must have an average particle diameter ($d_{50}$) of no more than 40 microns. In other words, they may be primary particles of fluororesin whose average particle diameter is no more than 40 microns, or they may be floc of these primary particles. If the primary particle diameter is greater than this, the voids in the porous material thus formed will be so large that water will readily penetrate into said voids and the air therein will be replaced by the water, so the resulting porous material will not be suitable for purpose of water repellency. The preferable particle diameter that is suited to layering will vary with the coating method, but a particle diameter of 0.1 to 20 microns is suitable with spray coating, and a particle diameter of 20 to 30 microns is suitable with electrostatic coating. The size of the voids in the porous material can be controlled by selecting the fluororesin particle diameter and floc diameter used.

In specific terms, the particles that are used can be colloid particles with an average particle diameter of about 0.2 microns obtained directly from emulsion polymerization, floc (so-called secondary particles) obtained by the coagulation of colloid particles with ethanol or the like, particles produced by drying this floc and repulverizing it, or particles larger than 40 microns obtained from suspension polymerization which are then pulverized, but in any case the primary particle diameter should be no more than 40 microns.

(Thickness)

If the porous material present at the articles surface is too thin, there is the chance that water droplets will come into contact with the substrate material and no water repellency will be manifested, and if the porous material is too thick, the strength of the article surface will be so low as to make the article impractical. Therefore, the thickness of the irregulary porous material usually should be 0.5 to 500 microns.

(Maximum IPA Diffusion Diameter)

The porosity of the article of the present invention can be compared by dropping a single drop of isopropyl alcohol (IPA) onto the fluororesin surface and measuring the maximum diameter at which the IPA will diffuse and penetrate into the porous material. With a cut sheet of PTFE that is not porous, the diameter at the time of dropping remains unchanged, but with the porous material of the present invention, the diameter of the IPA increases over that at the time of dropping as a result of the penetration of IPA into the porous material. The water-repellent article of the present invention is characterized by the fact that the maximum IPA diffusion diameter is at least 8 mm, but 16 mm or more is preferable, and 20 mm or more is even better.

(Water Repellency)

The surface of the article of the present invention exhibits excellent water repellency because it is covered with a porous material. For example, while the contact angle with water is only approximately 110 degrees in the case of a cut film of PTFE, which is a water-repellent material, the contact angle with water of the water-repellent article of the present invention is usually at least 150 degrees.

(Water Droplet Roll Angle)

It is difficult to compare the water repellency of a highly water-repellent article surface, such as that of the present invention, using a conventional contact angle measurement method. Therefore, the water droplet roll angle, i.e., the minimum angle of the article surface at which a water droplet will roll over the surface without adhering thereto when a water droplet has been dropped onto the article surface, is measured and termed the water droplet roll angle, which is expressed by the tangent thereof and used as a measure of water repellency. For instance, an angle of approximately 110 degrees is measured by the contact angle method for a cut film of PTFE, but a water droplet roll angle of approximately $120/500$ is exhibited by the same specimen. The water droplet roll angle of the article surface in the present invention is less than $50/500$.

(Substrate Article)

When the water-repellent fluororesin surface of the present invention is formed, the substrate article can be iron, aluminum, or another metal sheet that has been coated with a fluororesin conventionally, and as long as the material can withstand the treatment temperature at which the dispersion containing the fluororesin particles is dried (generally a temperature over 100° C.), it can also be selected from among various plastics, wood, paper, and other materials. As a pretreatment to these substrates, the fluororesin particles may be layered after an adhesive layer or a primer layer has first been formed.

(Manufacturing Method)

The article having a water-repellent fluororesin surface of the present invention is formed by hard-to-disengage layering of fluororesin particles with an average diameter of no more than 40 micron over one another, and it is composed of an irregularly material whose maximum IPA diffusion diameter is at least 8 mm and has a water droplet roll angle tangent of no more than $50/500$. The following methods can be cited as methods for manufacturing the article having a water-repellent fluororesin surface of the present invention.

For example, said article can be manufactured by a method in which an article is coated with fluororesin particles with an average diameter of no more than 40 microns, with water or an organic liquid containing said fluororesin particles, or with a mixed dispersion thereof, and the fluororesin particles are surface-fused in a state in which said particles can come into contact with each other, or by a method in which the surface fusion involves bonding with a film molding auxiliary, or by a method that involves fixing in a non-molten state. An optimal method may be selected in consideration of such water repellency and film strength as are required for the intended use and/or application of the water-repellent articles of the present invention.

First method is manufacturing an article having a water-repellent fluororesin surface by hard-to-disengage layering of fluororesin particles over one another by the surface fusion of the fluororesin particles. To put it concretely, the method consists of surface-fusing together, in a state in which the fluororesin particles can come into contact with each other, said fluororesin particles at a temperature that is over the melting commencement temperature and below the melting completion temperature of said fluororesin as determined by a differential scanning calorimetry (DSC) measurement. "Surface fusion" refers to the partial fusion of particles at their surface. Suitable strength can be imparted to the porous material without the voids formed by the resin particles disappearing if the fluororesin particles are fused together at a temperature at which they will essentially retain their particulate shape, i.e., between the melting commencement temperature and the melting completion temperature of said fluororesin as determined by DSC measurement.

There are no particular restrictions on whatever state in which the fluororesin particles are caused to come into contact with each other, but the surface should be coated with fluororesin particles by a method in which the articles is spray coated with water or an organic liquid, or a mixed dispersion of these, containing fluororesin particles with an average particle diameter of no more that 40 microns, a method in which the fluororesin particles are applied electrostatically, or another such method.

(Coating)

"Coating" refers to causing fluororesin particles or a dispersion containing fluororesin particles to adhere to the article surface by a standard method used with paints.

Spray coating, electrostatic coating, and dipping are examples of methods for coating the article surface with fluororesin particles with an average particle diameter of no more than 40 microns. To give a more specific example, there is a method in which a fluororesin dispersion obtained from emulsion polymerization with an average particle diameter of about 0.2 microns is applied by spray coating. In this spray coating process, a porous material is formed by the layering of the fluororesin particles over one another, and the size of voids can be controlled by the coating conditions. The spray coating may be performed after ethanol or another coagulant has been added to an aqueous dispersion to coagulate the particles. Also, PFA or FEP powder paint with an average particle diameter of about 25 microns may be directly applied by electrostatic coating.

(Dispersion Medium)

Colloid particles obtained directly from emulsion polymerization, floc obtained by the coagulation of these colloid particles with ethanol, or particles obtained by pulverizing particles obtained from suspension polymerization are used in the manufacture of the water-repellent article of the present invention. In order to form an irregularly porous material using these particles, the particles should be dispersed in a liquid at the point in time when the article is to be coated.

When the irregularly porous material formed by the fluororesin particles contains a large quantity of a surfactant, the water droplets in the porous material will be in a state in which they are readily absorbed into the porous material, and no water repellency will be manifested. Consequently, with the present invention, when the dispersion containing the fluororesin particles is to be applied by spray coating, etc., it is preferable for the dispersion medium not to contain a surfactant, but it can contain a surfactant in about the same amount as when one is used as an emulsifier in the manufacture of a fluororesin by emulsion polymerization since this will have no substantial effect on water repellency.

Water is preferable as the dispersion medium from the standpoint of non-ignitability and environmental safety, in which case the fluororesin particles can be coagulated by the addition of ethanol.

(Surface Fusion Temperature)

The irregularly porous material is obtained by surface-fusing together the fluororesin particles that coat the surface of the article, but in order to form a porous material by surface fusion of fluororesin particles whose average particle diameter is no more than 40 microns and to increase the strength of the film itself and its adhesive strength with the article, the heat treatment temperature must be strictly regulated.

When the temperature is raised after the article has been coated with a dispersion containing the fluororesin particles, the dispersion medium evaporates with rise in the temperature, the remaining fluororesin particles are stacked one over the other, and an irregularly porous material is formed on the article. Since the particles are yet to be surface-fused together below the melting commencement temperature (according to DSC measurement), the void content is high, so water repellency is high but strength is low. However, over the melting commencement temperature, the particles fuse together at their surface, the void content gradually decreases, and there is also a certain amount of decrease in water repellency compared to before surface fusion, but there is an increase in strength. When, however, the temperature is further raised and the material is heated for a long time over the melting completion temperature, the fluororesin particles undergo overall fusion, the porous material disappears, the surface becomes smooth, and there is a pronounced decrease in water repellency. Ten minutes or more is usually enough for the duration of surface fusion of the particles, but about 15 to 20 minutes is particularly favorable.

Figure 1:
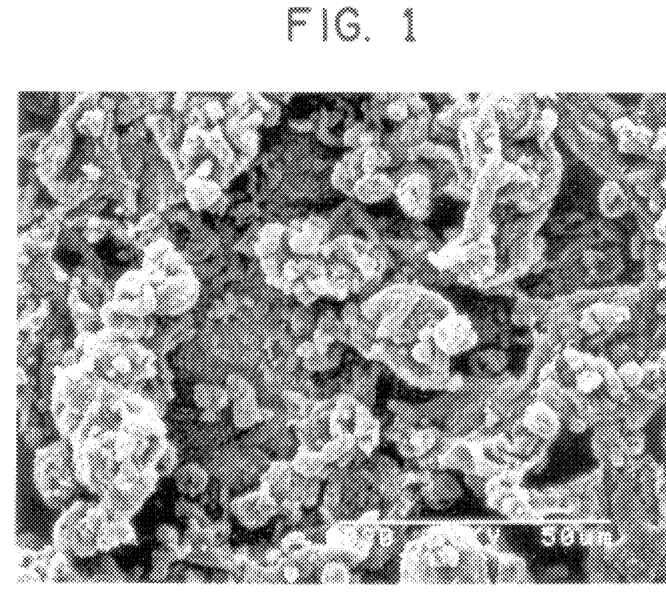
FIG. 1 is an electron micrograph of the water-repellent fluororesin surface of the article of the present invention obtained in Example 1.
Figure 2:
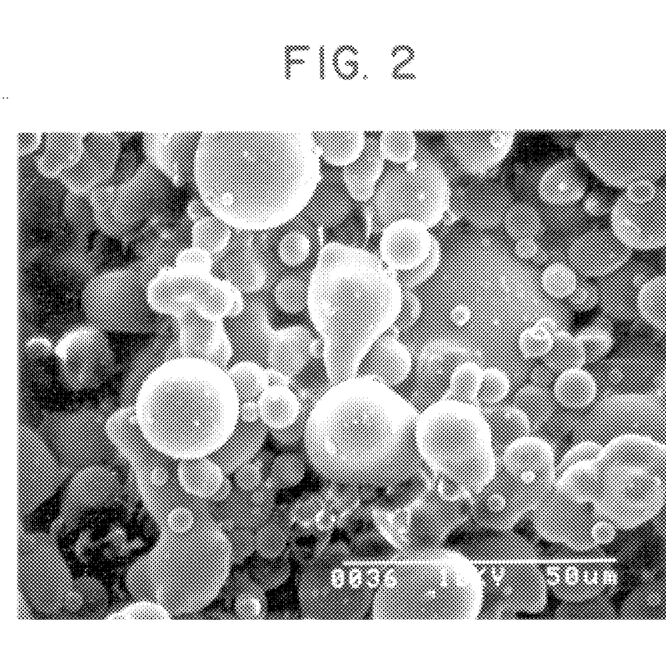
FIG. 2 is an electron micrograph of the water-repellent fluororesin surface of the article of the present invention obtained in Example 5.

The porous material manufactured by the above-mentioned method is constructed of an irregularly fluororesin structure and voids as illustrated by the electron micrographs in FIG. 1 and FIG. 2. What characterizes the irregularly porous material of the present invention is the fact that individual hard-to-disengage fluororesin particles with an average diameter of no more than 40 microns are observed in the said structure. In contrast with the said porous material, the surface of the article obtained by fusing fluororesin particles at a temperature above the melting temperature of such fluororesin exhibits overall fusion as illustrated by FIG. 6 wherein there exists no void, thus keeping it from forming a porous material. Two or more types of fluororesin particles can also be used in order to support the porous material, such as using a PTFE resin as the pore-forming particles and a heat-fusible PFA resin or FEP resin as an auxiliary material, and in this case the surface fusion is carried out at a temperature that is over the melting commencement temperature and under the melting completion temperature of the PTFE resin, using as the standard a PTFE resin with a high melting completion temperature.

The heat treatment temperature which is selected for heat treating the fluororesin particles coated onto the surface of the article immensely affects the void content and the strength of the produced irregularly material. Although the above-mentioned first method which comprises heat treatment carried out at a temperature which is above the melting commencement temperature and below the melting completion temperature as determined by the DSC measurement is an excellent method whereby an article having a suitably high void content and exhibits high water repellency is produced, the inventor of the present invention, after having studied other methods by which to obtain an article having a fluororesin surface which imparts an even higher water repellency, eventually discovered that by means of coating onto a substrate a dispersion containing high molecular weight fluororesin particles with a specific particle diameter and drying the applied dispersion at a temperature in a specific temperature range, the said fluororesin particles are fixed to the surface of the article in a non-molten state, thus allowing an irregularly porous material having a high void content to be formed by dint of the stacking of fluororesin particles on top of each other, thus producing an article which imparts excellent water-repellency.

The object of the above-mentioned method is to provide a method for manufacturing an article having a fluororesin surface which is designed with an emphasis on water repellency.

This second method is the method for manufacturing the article of the present invention having a water-repellent fluororesin surface which comprises coating an article with water or an organic liquid containing fluororesin particles or a mixed dispersion thereof and drying, in a state wherein the fluororesin particles can come into contact with each other, the said dispersion at a temperature below the melting commencement temperature as determined by the DSC measurement, thus fixing the fluororesin particles to the surface of the article in a non-molten state.

There is no particular limitation to the manner in which to allow the fluororesin particles to come into contact with each other, and the same manner may be employed as is adopted for the first method. The coating method also may be be same as is adopted for the above-mentioned method.
(Treating Temperature)

For the purpose of adhering fluororesin particles to the surface of the article in a non-molten state after the dispersion containing them has been applied to the article and forming a porous material having a high void content from which the particles do not readily disengage, it is an essential step that the applied dispersion is dried at a temperature below the melting commencement temperature of the fluororesin concerned as determined by the DSC measurement. While any drying temperature may be suitable so long as it is below the melting commencement temperature of the fluororesin concerned as determined by the DSC measurement, it is preferably no higher than 50° C. from the viewpoint of the drying time required to achieve adhesion of the fluororesin particles to one another.

Figure 3:
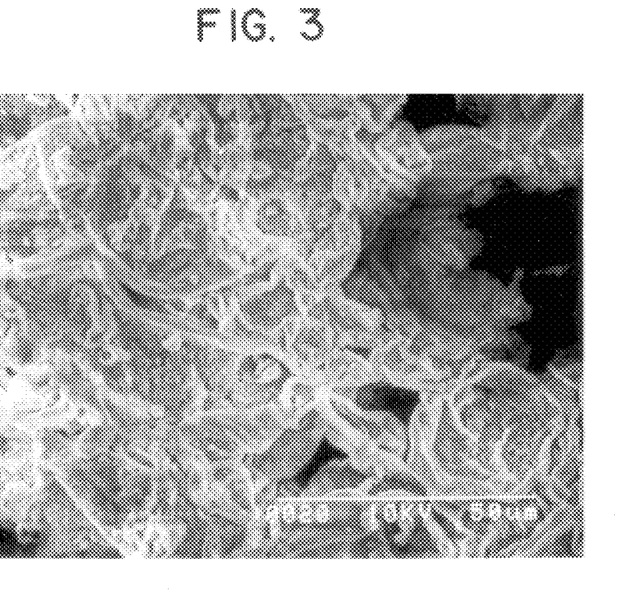
FIG. 3 is an electron micrograph of the water-repellent fluororesin surface of the article of the present invention obtained in Example 6.
Figure 4:
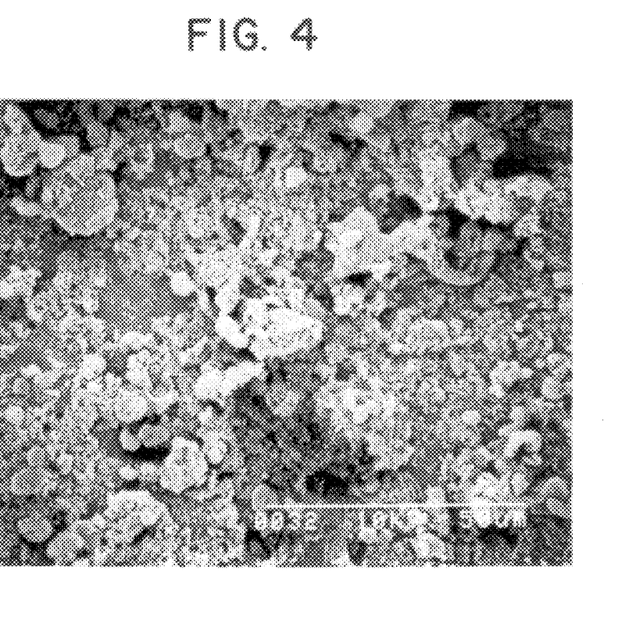
FIG. 4 is an electron micrograph of the water-repellent fluororesin surface of the article of the present invention obtained in Example 8.

The porous material thus produced is composed of an irregularly fluororesin structure and voids as illustrated by the electron micrographs in FIG. 3 and FIG. 4. It is a characteristic of the irregularly porous material of the present invention that there are observed in such structure individual hard-to-disengage fluororesin particles with an average particle diameter of no more than 4 microns. In contrast with the said porous material, the surface of the article obtained by fusing fluororesin particles at a temperature above the melting temperature of such fluororesin exhibits overall fusion as illustrated by FIG. 6 wherein there exists no void, thus keeping it from forming a porous material.

In order to form a porous material, two or more kinds of fluororesin particles, for example, PTFE resin as the porous material-forming particles and thermoplastic PFA resin or FEP resin as an auxiliary, may be used. In such a case, the drying temperature for the second method, namely, the method which depends on drying, is set below the melting commencement temperature of such fluororesin that has a higher melting commencement temperature. In the case where a thermoplastic fluororesin is used as an auxiliary, such fluororesin acts as a film molding auxiliary, depending upon the type, particle diameter and drying temperature selected therefor with the result that the fluororesin particles fixed to the surface of the article in a non-molten state are caused to adhere to each other and thus a water-repellent fluororesin surface having an excellent strength can be obtained.

Although an article having a fluororesin surface that has excellent water-repellency can be obtained by fixing fluororesin particles to the surface of such article by the above-mentioned second method, that is to say, the method by which the dispersion is dried at a temperature below the melting commencement temperature of the fluororesin concerned as determined by the DSC measurement, the inventor of the present invention has discovered that in cases where an article having a fluororesin surface that has an even higher strength as well as excellent water repellency is required, an irregularly porous material can be formed in which fluororesin particles hardly disengage by dint of layering of fluororesin particles over one another by means of including a film molding auxiliary in the dispersion containing fluororesin particles when such dispersion is applied to the article and causing the fluororesin particles to adhere to each other by the action of the film molding auxiliary by drying the said dispersion at a temperature below the melting commencement temperature of the fluororesin concerned as determined by the DSC measurement, thus rendering it possible to obtain an article having a fluororesin surface that has high water repellency and an excellent strength.

According to the above-mentioned method, a porous material having a high void content can be obtained by means of setting the heat treatment temperature at a relatively low level, and hence high water repellency can be imparted to the article. Additionally, by utilizing the adhesive action of the film molding auxiliary which is present in the dispersion, a sufficient strength can be achieved. The object of this method is, therefore, to provide a method for manufacturing an article having a fluororesin surface that exhibits a great strength as well as excellent water repellency.

This third method is another method for manufacturing the article of the present invention which has a water-repellent fluororesin surface which comprises coating an article with water or an organic liquid containing fluororesin particles and a film molding auxiliary or a mixed dispersion thereof and adhering the fluororesin particles by the action of the film molding auxiliary by drying the said dispersion at a temperature below the melting commencement temperature of the fluororesin concerned as determined by the DSC measurement.
(Film Molding Auxiliary)

It is due to the cohesion of particles imparted by the action of stacking of fluororesin particles on top of each other that an irregularly porous material is formed and preserved. Nevertheless, in order to form a stronger porous material, a film molding auxiliary is used which bonds fluororesin particles to each other. The film molding auxiliary is dissolved or dispersed in water, an organic liquid or a mixture thereof, and then applied to the surface of the article along with fluororesin particles. The manner in which it is applied may be the same as is adopted for the other above-mentioned manufacturing methods.

The dispersion applied to the surface of the article is dried at a temperature below the melting commencement temperature of the fluororesin concerned as determined by the DSC measurement and the fluororesin particles are gradually caused to adhere to each other by the action of the film molding auxiliary. Here the notion "adhesion" means that the fluororesin particles are fixed in the form of the structure of the porous material by the action of the film molding auxiliary. There is no particular limitation to the type of the film-forming auxiliary so long as it imparts the film molding property at a temperature below the melting commencement temperature of the fluororesin which constitutes the porous material as determined by the DSC measurement. There may be used as such film molding auxiliary various organic film-forming compounds or inorganic film-forming compounds.

There may be cited as examples of the organic film-forming compounds organic polymers such as acrylic resin, polyimide prepolymer, aminosilane, tetrafluoroethylene-vinyl acetate copolymer, alkyd resin, epoxy resin, polyamide resin, polyimide resin, polysulfonic resin, silicone resin, polyurethane resin, acrylic silicone resin, or polyester resin. In cases where two or more different types of fluororesin are used in a mixture, the fluororesin having a lower melting temperature may be utilized as the film molding auxiliary of the present invention. For example, in the combination of PTFE resin to be used as the porous material-forming particle and a thermoplastic PFA resin or FEP resin to be used as the film molding auxiliary, in case a suitable kind and a suitable particle diameter are selected for the thermoplastic fluororesin and the drying is performed at a temperature below the melting commencement temperature of the PTFE resin, such thermoplastic fluororesin can impart film-forming property at such drying temperature, and hence such thermoplastic fluororesin can be used as a film molding auxiliary.

There may be cited as examples of the inorganic film-forming compounds colloidal silica, lithium silicate, alumina sol and zirconia sol. These organic film-forming compounds or inorganic film-forming compounds may be used singularly, while two or more types of film molding auxiliary may be used in a mixture thereof.

The preferable weight ratio of the porous material-forming fluororesin particles to the film molding auxiliary is about 1:0.01 –1:2 in the case of an organic film molding auxiliary and about 1:0.1–1:4 in the case of an inorganic film molding auxiliary.

(Dispersion Medium)

Colloid particles obtained directly from emulsion polymerization, floc obtained by the coagulation of these colloid particle with ethanol, or particles obtained by pulverizing particles obtained from suspension polymerization are used in the manufacture of the water-repellent article of the present invention. In order to form an irregularly porous material using these particles, the particles should be dispersed in a liquid at the point in time when the article is to be coated.

In view of the above-mentioned requirement, it is preferable that the particles are dispersed in the liquid, and, therefore, a dispersion medium containing a film molding auxiliary is used. For the purpose of adhering the fluororesin particles to each other with the film molding auxiliary after the dispersion has been applied to the article, it is requisite to dry the dispersion medium at a temperature below the melting commencement temperature of the fluororesin concerned as determined by the DSC measurement. The drying temperature for the dispersion medium should be below the melting commencement temperature of the fluororesin concerned as determined by the DSC measurement. From the viewpoint of the drying time required to achieve adhesion of the fluororesin particles to each other, however, it is preferable that such drying temperature is not lower than 50° C.

In cases where two or more kinds of fluororesin particles, for example, PTFE resin as the porous material-forming particle and a thermoplastic PFA resin or FEP resin as the film molding auxiliary, are used in order to preserve the porous material, the heat treatment temperature may be set below the melting commencement temperature of the PTFE resin whose melting commencement temperature is higher than that of the other.

Figure 5:
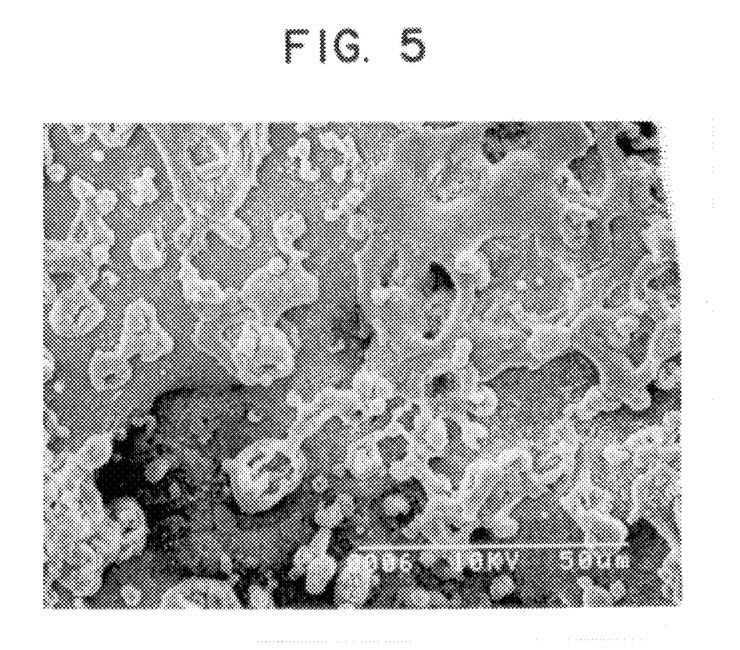
FIG. 5 is an electron micrograph of the water-repellent fluororesin surface of the article of the present invention obtained in Example 14.
Figure 6:
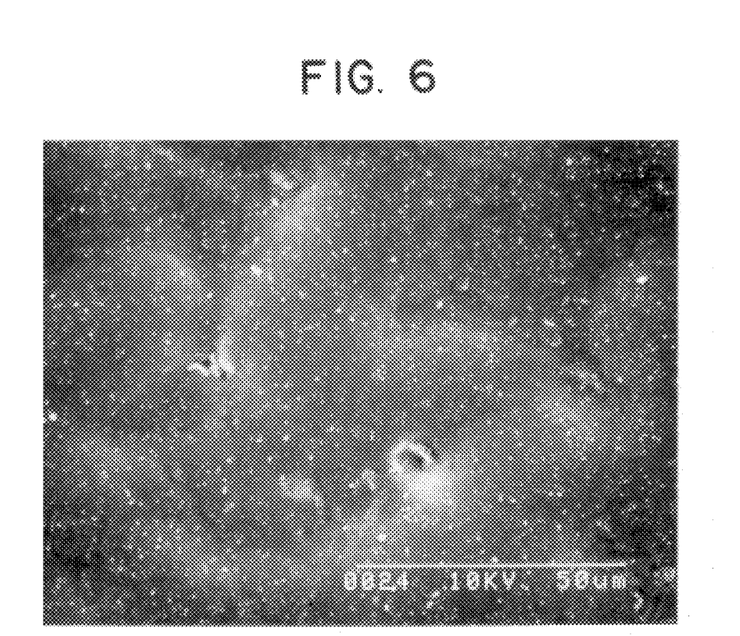
FIG. 6 is an electron micrograph of the water-repellent fluororesin surface of the article obtained in Comparative Example 2.

The porous material manufactured by the said method is composed of an irregularly fluororesin structure and voids as illustrated by the electron micrograph in FIG. 5 in consequence of irregular layering of fluororesin particles over one other. What characterizes the irregularly porous material of the present invention is the fact that individual fluororesin particles with a microscopic particle diameter, which are adhered to each other with the film molding auxiliary and are in a state wherein they hardly disengage from each other, are observed in the said structure. In contrast with the said porous material, the surface of the article obtained by fusing fluororesin particles at a temperature above the melting temperature of such fluororesin exhibits overall fusion as illustrated by FIG. 6 wherein there exists no void, thus keeping it from forming a porous material.

DESCRIPTION OF THE PREFERRED EMBODIMENT

The present invention will now be described in specific terms by giving examples and comparative examples. The types of raw material fluororesin particles used in the examples, the temperature measurement method, the coating method, the method for measuring the properties of the finished product, etc., were as follows.

(1) Raw Material Fluororesin Particles

The fluororesins used as raw materials are shown in Table 1. Here, T1 is the melting commencement temperature, Tpeak is the melting peak temperature, and T2 is the melting completion temperature.

TABLE 1

| | Average particle diameter ($\mu$m) | DSC melting temperature (° C.) | | |
|---|---|---|---|---|
| | | T1 | Tpeak | T2 |
| PFA aqueous dispersion | 0.17 | 270 | 307 | 315 |
| FEP aqueous dispersion | 0.16 | 235 | 262 | 275 |
| PTFE aqueous dispersion | 0.22 | 313 | 337 | 346 |
| PTFE molding powder | 26 | 321 | 345 | 354 |
| PFA powder paint | 25 | 274 | 308 | 319 |
| FFA powder paint | 63 | 275 | 309 | 319 |

Average particle diameter measurement method

For a powder whose average particle diameter was 5 to 300 microns, a microtracking method was employed using a model 17991-01 Microtrack particle size analyzer made by Leeds & Northrup. For particles whose average diameter was 0.5 microns or less, a turbidity measurement method was employed using a Shimadzu multipurpose autospectrophotometer (halogen lamp).

(2) DSC melting temperature measurement method

A model DSC-7 differential scanning calorimeter made by Perkin-Elmer was used. 5 mg of sample was weighed out and put into an aluminum pan and crimped with a crimper, after which it was housed in the DSC unit and the temperature raised. The temperature was raised at a rate of 10° C. per minute from 200° C. to 380° C., and the melting commencement temperature (T1), the melting peak temperature (Tpeak), and the melting completion temperature (T2) were determined from the melting curve obtained at this point.

(3) Coating Method

Spray Coating

An aluminum sheet measuring 2 mm thick, 50 mm wide, 100 mm long was spray coated at an air pressure of 3 kg/cm²G from a nozzle with a diameter of 0.6 mm.

Electrostatic Coating

Using an electrostatic coater (GX-200T, made by Onoda Cement) and an electrostatic powder coating gun (GX-107, made by Onoda Cement), an aluminum sheet measuring 2 mm wide, 50 mm wide, and 100 mm long and grounded 25 cm away was electrostatically sprayed and coated at a coating voltage of 10 Kv (negative) and a discharge rate of approximately 50 g/min.

(4) Water Droplet Roll Angle Measurement Method

A board 550 mm in length was inclined by raising one end thereof, and an aluminum sheet (50 mm wide and 100 mm long) on which a porous material had been formed was placed on top of this inclined sheet, and a 0.05 g water droplet of distilled water was dropped from a nozzle 8 mm above the surface. The minimum inclination at which this water droplet would roll down along the incline without stopping after being dropped on the surface was expressed as the elevation (mm) per 500 mm of horizontal distance, i.e., the tangent of the inclination angle.

(5) Porosity Measurement Method (maximum isopropyl alcohol diffusion diameter test)

0.01 mL of IPA was dropped onto the irregularly porous material using a microsyringe, and the maximum diffusion diameter in millimeter of the liquid was measured. With a porous material, the IPA penetrates into the coating film and diffuses from the diameter at the time of dropping to a diameter of about 20 mm, but with a cut sheet of PTFE, the initial diameter of approximately 5.0 mm remains unchanged.

(6) Evaluation of the water resistance of the porous material

Water of a 15 to 20° C. temperature was dropped onto the porous material from a 1.5 m height at a showering rate of 100 mm/min. for 10 minutes using a gardening sprinkler (with a nozzle made by Toyox, 445 orifices, the orifice diameter: 0.3 mm), and then the porous material was air dried. The remaining weight in percentage of the porous material was calculated on the basis of the difference in weight between the pre-showering weight and the post-showering weight. Thus was evaluated the water resistance of the porous material.

Examples 1 to 5 (Method by surface-fusing)

Example 1 aluminum sheet was spray coated with a PFA aqueous dispersion (average particle diameter: 0.17$\mu$m ) obtained by emulsion polymerization. The coating was dried for 20 minutes at 120° C., after which it was heat treated for 20 minutes at 310° C. to produce an article having a water-repellent PFA resin surface. FIG. 1 shows an electron micrograph of the surface of the article thus obtained. As seen in the figure, PFA resin particles with a microscopic particle diameter are stacked one over the other, forming voids between the resin particles and creating a porous material with an irregular shape. The water droplet roll angle tangent of this surface was 1/500. The maximum isopropyl alcohol diffusion diameter was 23 mm.

When a water droplet was dropped onto the irregularly porous material manufactured in this manner, the water droplet only came into contact with the fluororesin at the protruding portions of the irregularly porous material, so the water repellency was extremely high, and the wetting angle with respect to water was roughly 150 degrees. The results of this example are shown in Table 2 along with Examples 2 through 5, and Comparative Examples 1 through 6.

Example 2

2 g of water and 2 g of ethanol were added to 3 g of an FEP aqueous dispersion (average particle diameter: 0.16 $\mu$m ) obtained by emulsion polymerization, and these components were mixed well and coagulated under ultrasonic waves, after which this product was applied to an aluminum sheet by spray coating. The coating was dried for 20 minutes at 120° C., after which it was heat treated for 20 minutes at 260° C. to produce an article having a water-repellent FEP resin surface. The water droplet roll angle tangent of this surface was 3/500. The maximum isopropyl alcohol diffusion diameter was 20 mm.

Example 3

Water was added to a PTFE aqueous dispersion (average particle diameter: 0.22 $\mu$m ) obtained by emulsion polymerization so as to dilute the dispersion to a solids concentration of 23 wt. %. This product was applied to an aluminum sheet by spray coating. The coating was dried for 20 minutes at 120° C., after which it was heat treated for 20 minutes at 340° C. to produce an article having a water-repellent PTFE resin surface. The water droplet roll angle tangent of this surface was 1/500. The maximum isopropyl alcohol diffusion diameter was 16 mm.

Example 4

1 g of PTFE molding powder (average particle diameter: 26$\mu$m) and 1 g of a PFA aqueous dispersion (average particle diameter: 0.17 $\mu$m ) obtained by emulsion polymerization were dispersed and mixed in 5 g of ethanol, and this product was applied to an aluminum sheet by spray coating. The coating was dried for 20 minutes at 120° C., after which it was heat treated for 20 minutes at 350° C. to produce an article having a water-repellent fluororesin surface. The water droplet roll angle tangent of this surface was 12/500. The maximum isopropyl alcohol diffusion diameter was 8 mm.

In this experiment, two types of fluororesin particles with different melting points were used for the raw material, and while the PFA resin melted because of the heat treatment at 350° C., since this temperature was below the melting completion temperature of the high-melting point PTFE resin, a PTFE porous material was formed, producing an article having a surface with excellent strength and water repellency.

Example 5

An aluminum sheet was electrostatically coated with a PFA powder paint (average particle diameter: 25 $\mu$m ), and the coating was baked for 20 minutes at 310° C. to produce an article having a water-repellent PFA resin surface.

FIG. 2 shows an electron micrograph of the surface of the article thus obtained, and as seen in the figure, PFA resin particles with a microscopic diameter were stacked one over the other, forming a porous material having voids between the resin particles. The water droplet roll angle tangent of this surface was 7/500. The maximum isopropyl alcohol diffusion diameter was 20 mm.

Comparative Example 1

An aluminum sheet was electrostatically coated with a PFA powder paint (average particle diameter: 63 $\mu$m ), and the coating was baked for 20 minutes at 310° C. The water droplet roll angle tangent of this surface was 23/500. The maximum isopropyl alcohol diffusion diameter was 16 mm.

Comparative Example 2

An aluminum sheet was spray coated with a PFA aqueous dispersion (average particle diameter: 0.17 $\mu$m ) obtained by emulsion polymerization, and the coating was dried for 20 minutes at 120° C., after which it was heat treated for 20 minutes at 360° C. (over the melting completion temperature) to produce an article having a PFA resin surface. As shown by the electron micrograph in FIG. 6 of the surface of the article thus obtained, all of the PFA resin particles melted throughout the area, so there were no voids between the resin particles and the material was not porous. The water droplet roll angle tangent of this surface was 150/500. The maximum isopropyl alcohol diffusion diameter was 5.0 mm.

Comparative Example 6

A PTFE molding powder (average particle diameter: 26 μm) was compression molded and baked, and a film with a thickness of 0.1 mm was cut out of the resulting billet. The water droplet roll angle tangent of this film was 120/500. The maximum isopropyl alcohol diffusion diameter was 5.0, mm.

TABLE 2

|  | Fluoro resin | Particle diameter | Surfactant (wt %) | Coating method | Treatment temp. & time ° C. × min | Tangent of water droplet roll angle | IPA diffusion diameter test |
| --- | --- | --- | --- | --- | --- | --- | --- |
| Example 1 | PFA | 0.17 μm | none | Spray | 120 × 20<br>310 × 20 | 1/500 | 23 mm |
| Example 2 | FEP | 0.16 μm | none | Spray | 120 × 20<br>260 × 20 | 3/500 | 20 mm |
| Example 3 | PTFE | 0.22 μm | none | Spray | 120 × 20<br>340 × 20 | 1/500 | 16 mm |
| Example 4 | PFA<br>PTFE | 0.17 μm<br>26 μm | none | Spray | 120 × 20<br>350 × 20 | 12/500 | 8 mm |
| Example 5 | PFA | 25 μm | none | E.S.C | 310 × 20 | 7/500 | 20 mm |
| Comparative Ex. 1 | PFA | 63 μm | none | E.S.C | 310 × 20 | 53/500 | 16 mm |
| Comparative Ex. 2 | PFA | 0.17 μm | none | Spray | 120 × 20<br>360 × 20 | 150/500 | 5 mm |
| Comparative Ex. 3 | PTFE | 0.22 μm | 3.6* | Spray | 120 × 20 | could not be measured | |
| Comparative Ex. 4 | PFA | 0.17 μm | none | Spray | 120 × 20<br>360 × 20 | 115/500 | 5 mm |
| Comparative Ex. 5 | PFA | 25 μm | none | E.S.C** | 360 × 20 | 115/500 | 5 mm |
| Comparative Ex. 6 | PTFE | 26 μm | none | Compression Molding | — | 120/500 | 5 mm |

*wt % with respect to fluororesin weight
**electrostatic coating

Comparative Example 3

A PTFE aqueous dispersion (average particle diameter: 0.22 μm) containing a surfactant in an amount of 3.6 wt. % with respect to the particle weight was diluted with water to a solids concentration of 20 wt. %, and this product was applied to an aluminum sheet by spray coating. The coating was dried for 20 minutes at 120° C. to produce an article having a PTFE resin surface. The water droplet roll angle tangent of this surface could not be measured because the water droplets were absorbed into the film.

Comparative Example 4

2 g of water and 2 g of ethanol were added to 3 g of a PFA aqueous dispersion (average particle diameter: 0.17 μm) obtained by emulsion polymerization, and these components were mixed well and coagulated, after which this product was applied to an aluminum sheet by spray coating. The coating was dried for 20 minutes at 120° C., after which it was baked for 20 minutes at 360° C. to produce an article having a PFA resin surface. The water droplet roll angle tangent of this surface was 115/500. The maximum isopropyl alcohol diffusion diameter was 5.0 mm.

Comparative Example 5

An aluminum sheet was electrostatically coated with a PFA powder paint (average particle diameter: 25 μm), and the coating was baked for 20 minutes at 360° C. to produce an article having a PFA resin surface. The water droplet roll angle tangent of this surface was 115/500. The maximum isopropyl alcohol diffusion diameter was 5.0 mm.

Examples 6 to 13 (Method in the non-molten state)

Example 6

Water was added to a PTFE aqueous dispersion (average particle diameter: 0.22 μm) obtained by emulsion polymerization so as to dilute the dispersion to a solids concentration of 23 wt. %. This product was applied to an aluminum sheet by spray coating. The coating was dried for 20 minutes at 120° C., to produce an article having a water-repellent PTFE resin surface.

An electron micrograph of the surface of the obtained article as shown in FIG. 3 demonstrates that PTFE resin particles with a microscopic particle diameter are stacked one over the other to form voids among the resin particles, thus producing a porous material assuming an irregular shape.

The droplet roll angle tangent of this surface was 1/500. The maximum isopropyl alcohol diffusion diameter was 20 mm.

When a water droplet was dropped onto the pronged irregularly porous material manufactured in this manner, the water droplet only came into contact with the fluororesin at the protruding portions of the irregularly porous material, so the water repellency was extremely high, and the wetting angle with respect to water was roughly 150 degrees or more. The result of this example are shown in Table 3 along with Examples 7 through 13.

Example 7

2 g of water and 2 g of ethanol were added to 3 g of an FEP aqueous dispersion (average particle diameter: 0.16 μm) obtained by emulsion polymerization, and these components were mixed well and coagulated under ultrasonic waves, after which this product was applied to an aluminum sheet by spray coating. The coating was dried for 20 minutes at 120° C., to produce an article having a water-repellent FEP surface. The droplet roll angle tangent of this surface was 1/500. The maximum isopropyl alcohol diffusion diameter was 20 mm.

Example 8

Water was added to a PTFE aqueous dispersion (average particle diameter: 0.17 μm ) obtained by emulsion polymerization so as to dilute the dispersion to a solids concentration of 14 wt. %. After coagulating the dispersion by adding ethanol in an amount equivalent to 10 wt. %, the dispersion was applied to an aluminum sheet by spray coating. The coating was heat treated for 30 minutes at 100° C. to produce an article having a water-repellent PFA resin surface. The electron micrograph of the surface of the obtained article as shown in FIG. 4 demonstrates that PFA resin particles with a microscopic diameter are alternately stacked in a non-molten state to form voids among them, producing a porous material which assumes an irregular shape. The measurements of the droplet roll angle tangent and the maximum isopropyl alcohol diffusion diameter and the results of the water resistance evaluation test are shown in Table 3.

Examples 9–10

An article having a water-repellent fluororesin surface was obtained in the same manner as employed in Example 4, except that the heat treatment temperature was changed to 150° C. and 250° C., respectively. The measurements of the droplet roll angle tangent and the maximum isopropyl alcohol diffusion diameter and the results of the water resistance evaluation test are shown in Table 3.

Examples 11–13

Water was added to a PTFE aqueous dispersion (average particle diameter: 0.22 μm ) obtained by emulsion polymerization so as to dilute the dispersion to a solids concentration of 14 wt. %. This product was applied to an aluminum sheet by spray coating. After coagulating the dispersion by adding ethanol in an amount equivalent to 10 wt. %, this dispersion was applied to an aluminum sheet by spray coating. The coating was heat treated for 30 minutes at the temperature shown in Table 3 to produce articles having a water-repellent PFA resin surface. The measurements of the droplet roll angle tangent the maximum isopropyl alcohol diffusion diameter and the results of the water resistance evaluation test are shown in Table 3.

Examples 14–20 (Method using a film molding auxiliary)

Example 14

An aqueous solution of water-soluble acrylic resin (manufactured by Asahi Pen; water-borne glossy varnish) diluted with water to have an active component of 14% was added to a mixed liquid (adjusted to a resin content ratio of 1:1 by weight) of a PFA aqueous dispersion (average particle diameter: 0.17 μm ) obtained by emulsion polymerization and a PTFE aqueous dispersion (average particle diameter: 0.22 μm ) obtained by emulsion polymerization in an amount equivalent to 10 wt. % as against the total PFA and PTFE solids content. This product was applied to an aluminum sheet by spray coating. The aluminum sheet thus prepared was heat treated for 30 minutes at 50° C. to produce an article having a water-repellent fluororesin surface.

The electron micrograph of the surface of the obtained article as shown in FIG. 5 demonstrates that resin particles with a microscopic diameter are alternately stacked in a non-molten state to form voids among them, producing a porous material which assumes an irregular shape. The droplet roll angle tangent of this article was 1/500.

The maximum isopropyl alcohol diffusion diameter was 19 mm, and the wetting angle with respect to water was about 150 degrees or more, while the water resistance ratio was 52%. The results of this Example are shown in Table 4 along with Examples 15 through 20 and Comparative Example 7.

Example 15

A dispersion prepared by adding water to an aqueous PFA dispersion (average particle diameter: 0.17 μm ) obtained by emulsion polymerization so as to dilute it to a solids concentration of 14 wt. % was admixed with aminosilane (manufactured by Shin-etsu Chemical; KBM-603) diluted with water to 14 wt. % which was added in an amount equivalent to 80 wt. % as against the PFA solids. This product was applied to an aluminum sheet by spray coating. The aluminum sheet thus prepared was heat treated for 30 minutes at 250° C. to produce an article having a water-repellent fluororesin surface.

The droplet roll angle tangent of the surface of this article was 1/500. The maximum isopropyl alcohol diffusion diameter was 20 mm, and the water resistance ratio 93%.

Example 16

A PFA aqueous dispersion (average particle diameter: 0.17 μm) obtained by emulsion polymerization was coagu-

TABLE 3

| Example | Fluororesin | Particle diameter (μm) | Surfactant (wt %) | Coating method | Treatment temp. & time ° C. × min | Tangent of water droplet roll angle | IPA diffusion diameter test | Water resistance ratio |
|---|---|---|---|---|---|---|---|---|
| 6 | PTFE | 0.22 | none | Spray | 120 × 20 | 1/500 | 20 mm | |
| 7 | FEP | 0.16 | none | Spray | 120 × 20 | 1/500 | 20 mm | |
| 8 | PFA | 0.17 | none | Spray | 100 × 30 | 1/500 | 20 mm | 12% |
| 9 | " | " | " | " | 150 × 30 | 1/500 | 20 mm | 34% |
| 10 | " | " | " | " | 250 × 30 | 1/500 | 20 mm | 50% |
| 11 | PTFE | 0.22 | none | Spray | 100 × 30 | 1/500 | 20 mm | 74% |
| 12 | " | " | " | " | 150 × 30 | 1/500 | 20 mm | 78% |
| 13 | " | " | " | " | 250 × 30 | 1/500 | 20 mm | 84% | lated with nitric acid and then dried at 120° C. A dispersion was prepared by adding N-methyl-2-pyrrolidone to the organosol obtained by ultrasonic-dispersing the said product in ethanol so as to have a solids concentration of 10 wt. %. This dispersion was admixed with a polyimide prepolymer solution (manufactured by Toray; "Toranisu" PI#3000) in an amount equivalent to 20 wt. % as against the PFA solids. This product was applied to an aluminum sheet by spray coating. This aluminum sheet was heat treated for 30 minutes at 250° C., to produce an article having a water-repellent fluororesin surface. The droplet roll angle tangent of this surface was 1/500. Its maximum isopropyl alcohol diffusion diameter was 20 mm. Its water resistance ratio was 100%.

Example 17

After adjusting the solids concentration of a PFA aqueous dispersion (average particle diameter: 0.17 μm) obtained by emulsion polymerization to 14 wt. % by adding water, this dispersion was diluted with ethanol to a solids concentration of 7wt. %. To this mixed liquid water was added in an amount equivalent to 50 vol. %. Then, lithium silicate (manufactured by Nissan Chemical Industry; LSS-35; SiO2 solid content: 20–21 wt. %; $SiO_2/Li_2O$ mole ratio: 3.3–4.0) diluted with a 0.5 wt. % aqueous solution of nonionic surfactant (manufactured by Rohm & Haas; Tryton X-100) to a solids concentration of 7 wt. % was added to the said product in an amount equivalent to 150 wt. % of the PFA solid content. This product was applied to an aluminum sheet by spray coating.

This aluminum sheet was heat treated for 60 minutes at 50° C. to produce an article having a water-repellent fluororesin surface. The droplet roll angle tangent of this surface was 1/500. Its maximum isopropyl alcohol diffusion diameter was 22 mm. Its water resistance ratio was 84%.

Example 18

After adjusting the solids concentration of a PFA aqueous dispersion (average particle diameter: 0.17 μm) obtained by emulsion polymerization to 14 wt. % by adding water, this dispersion was diluted with ethanol to a solids concentration of 7 wt. %. To this mixed liquid water was added in an amount equivalent to 100 vol. %. Then, colloidal silica (manufactured by Nissan Chemical Industry; Snowtex K; total solids content: 28 wt. %; SiO2/K2 mole. ratio: 3.3–4.0) diluted with a 0.5 wt. % aqueous solution of nonionic surfactant (manufactured by Rohm & Haas; Tryton X-100) to a solids concentration of 14 wt. % was added to the said product in an amount equivalent to 150 wt. % of the PFA solid content. This product was applied to an aluminum sheet by spray coating.

This aluminum sheet was heat treated for 30 minutes at 150° C., to produce an article having a water-repellent fluororesin surface. The droplet roll angle tangent of this surface was 1/500. Its maximum isopropyl alcohol diffusion diameter was 22 mm. Its water resistance ratio was 77%.

Example 19

After adjusting the solids concentration of a PFA aqueous dispersion (average particle diameter: 0.17 μm) obtained by emulsion polymerization to 14 wt. % by adding water, this dispersion was diluted with ethanol to a solids concentration of 7 wt. %. To this mixed liquid water was added in an amount equivalent to 100 vol. %. Then, colloidal silica (manufactured by Nissan Chemical Industry; Snowtex N; $SiO_2$ total solids content: 20.5 wt. %) diluted with a 0.5 wt. % aqueous solution of nonionic surfactant (manufactured by Rohm & Haas; Tryton X-100) to a solids concentration of 10 wt. % was added to the said product in an amount equivalent to 70 wt. % of the PFA solid content. This product was applied to an aluminum sheet by spray coating.

This aluminum sheet was heat treated for 60 minutes at 100° C. to produce an article having a water-repellent fluororesin surface. The droplet roll angle tangent of this surface was 1/500. Its maximum isopropyl alcohol diffusion diameter was 20 mm. Its water resistance ratio was 85%.

Example 20

After adjusting the solids concentration of a PFA aqueous dispersion (average particle diameter: 0.17 μm) obtained by emulsion polymerization to 14 wt. % by adding water, an aqueous dispersion of tetrafluoroethylene-vinyl acetate copolymer (TFE-VA) diluted with water to a solids concentration of 14 wt. % was added to the said product in an amount equivalent to 100 wt. % of the PFA solid content. This product was applied to an aluminum sheet by spray coating.

This aluminum sheet was heat treated for 30 minutes at 150° C. to produce an article having a water-repellent fluororesin surface. The droplet roll angle tangent of this surface was 1/500. Its maximum isopropyl alcohol diffusion diameter was 20 mm. Its water resistance ratio was 98%.

Comparative Example 7

A PFA mixed aqueous dispersion was applied to an aluminum sheet by spray coating in the same manner as in Example 4. After having dried this aluminum sheet for 20 minutes at 120° C., the aluminum sheet was heat treated for 20 minutes at 360° C., a temperature over the melting completion temperature of PFA to obtain an article having a PFA resin surface. The droplet roll angle tangent of this surface was 120/500. Its maximum isopropyl alcohol diffusion diameter was 5.0 mm.

TABLE 4

| | Fluoro-resin | Particle diameter (μm) | Film molding auxiliary (as against wt % of fluororesin) | Coating method | Treatment temp. & time ° C. × min) | Tangent of water droplet roll angle | IPA diffusion diameter test | Water resistance ratio |
|---|---|---|---|---|---|---|---|---|
| Example | | | | | | | | |
| 14 | PFA | 0.17 | Water-soluble | Spray | 50 × 30 | 1/500 | 19 mm | 52 |
| | PTFE | 0.22 | acrylic resin | | | | | |

TABLE 4-continued

|  | Fluoro-resin | Particle diameter (μm) | Film molding auxiliary (as against wt % of fluororesin) | Coating method | Treatment temp. & time ° C. × min | Tangent of water droplet roll angle | IPA diffusion diameter test | Water resistance ratio |
|---|---|---|---|---|---|---|---|---|
| 15 | PFA | 0.17 | Aminosilane (80) | Spray | 250 × 30 | 1/500 | 20 mm | 93 |
| 16 | PFA | 0.17 | Polyimide prepolymer (20) | Spray | 250 × 30 | 1/500 | 20 mm | 100 |
| 17 | PFA | 0.17 | Lithium silicate (150) | Spray | 50 × 60 | 1/500 | 22 mm | 84 |
| 18 | PFA | 0.17 | Colloidal silica (150) | Spray | 150 × 30 | 1/500 | 22 mm | 77 |
| 19 | PFA | 0.17 | Colloidal silica (70) | Spray | 100 × 60 | 1/560 | 20 mm | 85 |
| 20 | PFA | 0.17 | TFE.VA Copolymer* | Spray | 150 × 30 | 1/500 | 20 mm | 98 |
| Comparative Ex. 7 | PFA | 0.17 | Lithium silicate (150) | Spray | 120 × 20 360 × 20 | 120/500 | 5 mm | |

*Tetrafluoroethylene.vinyl acetate copolymer

Effect of the Invention

The article of the present invention having a water-repellent fluororesin surface composed of an irregularly porous material exhibits high water repellency, and can be used in wide range of industrial applications, such as making electrodes water-repellent, as well as in construction applications in order to prevent the staining of electrical wires, insulators, and building tile, snow damage, icing, and salt damage.

The water-repellent article of the present invention can be manufactured by various methods, from among which a suitable one may be selected in consideration of such water repellency and the film strength as will be suitable for the intended use of the article to be obtained. Any of these methods renders it possible to form on the surface of the article a fluororesin layer having a great fusion strength as well as excellent water repellency.

I claim:

1. An article having a water-repellent fluororesin surface, wherein the fluororesin surface has a water droplet roll angle tangent of no more than $5/500$ and being composed of an irregularly porous material which has a maximum IPA diffusion diameter of at least 8 mm and is formed by irregularly stacking fluororesin particles with an average diameter of no more than 40 microns over one another.

2. The article having a water-repellent fluororesin surface according to claim 1, wherein the fluororesin particles are selected from the group consisting of a polytetrafluoroethylene resin, a tetrafluoroethylene-perfluoro(alkyl vinyl ether) copolymer resin, and a tetrafluoroethylene-hexafluoropropylene copolymer resin.

3. A method for manufacturing an article having a water-repellent fluororesin surface wherein the fluororesin surface has a water droplet roll angle tangent of no more than $5/500$ and being composed of an irregularly porous material which has a maximum IPA diffusion diameter of at least 8 mm and is formed by irregularly stacking fluororesin particles with an average diameter of no more than 40 microns over one another, which comprises coagulating fluororesin particles with an average particle diameter of no more than 40 microns, spray coating the article with a mixture containing fluororesin particles and a liquid selected from the group consisting of water, an organic liquid, and a mixed dispersion of water and an organic liquid, and surface-fusing the fluororesin particles to each other at a temperature between the melting commencement temperature and the melting completion temperature as determined by DSC measurement of said fluororesin.

4. The method for manufacturing an article having a water-repellent fluororesin surface according to claim 3, which comprises coagulating fluororesin particles by adding a coagulating agent.

5. The method for manufacturing an article having a water-repellent fluororesin surface according to claim 4, wherein coagulating agent is ethanol.

6. A method for manufacturing an article having a water-repellent fluororesin surface wherein the fluororesin surface has a water droplet roll angle tangent of no more than $5/500$ and being composed of an irregularly porous material which has a maximum IPA diffusion diameter of at least 8 mm and is formed by irregularly stacking fluororesin particles with an average diameter of 20 to 30 microns over one another, which comprises coating the article electrostatically with fluororesin particles with an average particle diameter of 20 to 30 microns, and surface-fusing the fluororesin particles to each other at a temperature between the melting commencement temperature and the melting completion temperature as determined by DSC measurement of said fluororesin.

7. A method for manufacturing an article having a water-repellent fluororesin surface wherein the fluororesin surface has a water droplet roll angle tangent of no more than $5/500$ and being composed of an irregularly porous material which has a maximum IPA diffusion diameter of at least 8 mm and is formed by irregularly stacking fluororesin particles with an average diameter of no more than 40 microns over one another, which comprises coating the article with a mixture containing fluororesin particles and a liquid selected from the group consisting of water, an organic liquid, and a mixed dispersion of water and an organic liquid, and fixing the fluororesin particles onto the surface of the article in the non-molten state by means of drying the mixture at a temperature below the melting commencement temperature of the fluororesin as determined by the DSC method.

8. The method according to claim 7 for manufacturing an article having a water-repellent fluororesin surface, which comprises coagulating fluororesin particles with an average particle diameter of no more than 40 microns, coating the article with a mixture containing fluororesin particles and a liquid selected from the group consisting of water, an organic liquid, and a mixed dispersion of water and an organic liquid, and surface-fusing fluororesin particles together.

9. A method for manufacturing an article having a water-repellent fluororesin surface wherein the fluororesin surface has a water droplet roll angle tangent of no more than $5/500$ and being composed of an irregularly porous material which has a maximum IPA diffusion diameter of at least 8 mm and is formed by irregularly stacking fluororesin particles with an average diameter of no more than 40 microns over one another, which comprises coating the article with a mixture containing fluororesin particles, a film forming auxiliary and a liquid selected from the group consisting of water, an organic liquid, and a mixed dispersion of water and an organic liquid, and adhering the fluororesin by the action of the film molding auxiliary onto the surface of the article in the non-molten state by means of drying such dispersion at a temperature below the melting commencement temperature of the fluororesin as determined by the DSC method.

10. The method according to claim 9 for manufacturing an article having a water-repellent fluororesin surface, wherein the film forming auxiliary comprises one or more kinds of organic film-forming compounds.

11. The method according to claim 10 for manufacturing an article having a water-repellent fluororesin surface, wherein the organic film-forming compound is selected from the group consisting of thermoplastic fluororesin, acrylic resin, polyimide prepolymer, aminosilane, tetrafluoroethylene-vinyl acetate copolymer, alkyd resin, epoxy resin, polyamide resin, polyimide resin, polysulfonic resin, silicone resin, polyurethane resin, acrylic silicone resin and polyester resin.

12. The method according to claim 9 for manufacturing an article having a water-repellent fluororesin surface, wherein the film forming auxiliary comprises one or more types of inorganic film-forming compound.

13. The method according to claim 12 for manufacturing an article having a water-repellent fluororesin surface, wherein the inorganic film-forming compound is a member selected from the group consisting of colloidal silica, lithium silicate, alumina sol and zirconia sol.

* * * * *